United States Patent [19]

Brandauer et al.

[11] Patent Number: 5,383,493
[45] Date of Patent: Jan. 24, 1995

[54] TUBE SWITCH

[75] Inventors: Otto Brandauer, Muehlacker; Gerhard Goth, Benningen, both of Germany

[73] Assignee: Filterwerk Mann & Hummel GmbH, Ludwigsburg, Germany

[21] Appl. No.: 141,666

[22] Filed: Oct. 26, 1993

[30] Foreign Application Priority Data

Oct. 26, 1992 [DE] Germany ............... 4235860

[51] Int. Cl.[6] .................................. F16K 11/06
[52] U.S. Cl. .................. 137/625.46; 137/625.48; 137/597
[58] Field of Search ........... 137/625.11, 625.12, 137/625.13, 625.15, 597, 625.46, 625.48, 625.42, 625.43

[56] References Cited

U.S. PATENT DOCUMENTS

| | | | |
|---|---|---|---|
| 1,566,605 | 12/1925 | Jamison | 137/597 X |
| 3,063,468 | 11/1962 | Dufour | 137/625.42 X |
| 3,071,155 | 1/1963 | Danley | 137/625.26 X |
| 3,570,314 | 3/1971 | Wagner | 137/597 X |
| 3,972,350 | 8/1976 | Pickett | 137/625.11 X |
| 4,063,572 | 12/1977 | Anderegg et al. | 137/625.46 X |
| 4,248,103 | 8/1981 | Pemberton | 137/625.48 X |
| 5,010,921 | 4/1991 | Nohl | 137/625.46 |
| 5,127,429 | 7/1992 | Kempf et al. | 137/625.11 X |
| 5,207,643 | 5/1993 | Davis | 137/625.46 X |
| 5,217,045 | 6/1993 | Gramm | 137/625.46 X |

OTHER PUBLICATIONS

Brandauer, O., Materialversorgung von Kunstsoff-Verarbeitungsmaschinen, 1990, pp. 772–775.
Hölter, Heinz, Rohrweiche, German Utility Model 18 77 47604/04/63, pp. 1–4.

Primary Examiner—John Rivell
Attorney, Agent, or Firm—Evenson, McKeown, Edwards & Lenahan

[57] ABSTRACT

A multi-way distributor having at least two mutually parallel and displaceable disks provided with at least two through-holes or connection pieces. At least two flexible tubes are fastened to at least two of these displaceable disks, and by the relative movements of the disks with respect to one another, different connections can be achieved which the distribution of the material flows takes place.

12 Claims, 6 Drawing Sheets

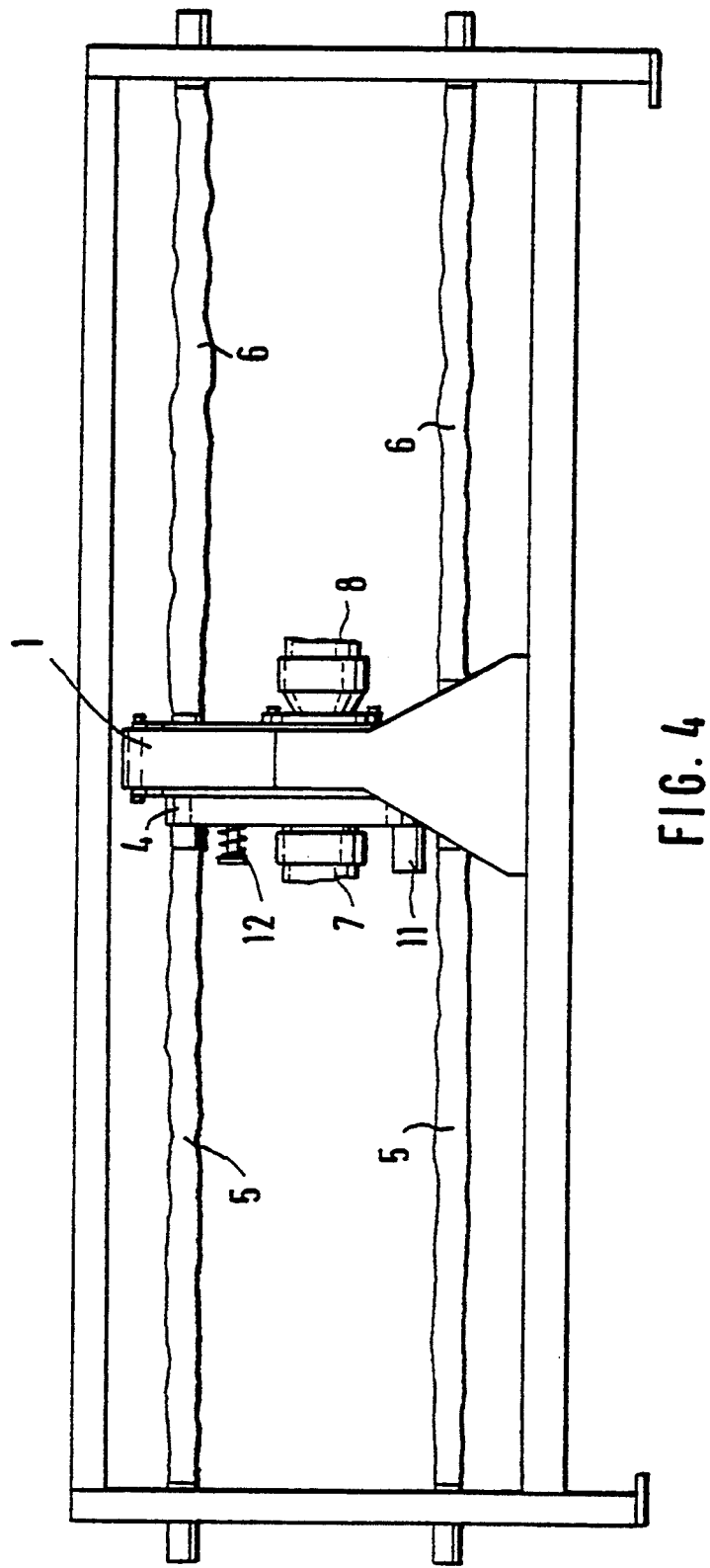

TUBE SWITCH

BACKGROUND OF THE INVENTION

The present invention relates to a tube switch for the distribution of material flows in tube systems.

Distributors of this type are known; for example, from the Journal *Kunststoffe* (Plastics), 80th Year, Pages 772 to 775, or from German Utility Model 18 77 476.

Several distributors of the type according to German Utility Model 18 77 476 might be connected in order to obtain a certain number of distribution possibilities. However, this arrangement would be complicated to control, and the solution would require a lot of space and would become correspondingly expensive. In the case of distributors of this type, particularly the long tube paths, which have to be evacuated in the case of a change of types, are also disadvantageous.

SUMMARY OF THE INVENTION

It is therefore an object of the invention to improve a distributor of the initially mentioned type such that a flexible distributor is provided which is easy to operate, small in size, easy to clean, and low in cost.

This and other objects are achieved according to the present invention in that at least two disks are provided which are parallel and displaceable with respect to one another and are provided with at least two through-holes and/or connection pieces, in which case at least two flexible tubes are fastened to at least two of these displaceable disks. By relative displacements of the disks with respect to one another, different connections are achievable, by means of which the distribution of the material flows takes place.

Because of the parallel disks, which are maximally spaced by a stationary housing wall between the displaceable disks, an extremely low dead volume that can be evacuated with low expenditures in time and energy will occur in the case of a change of articles. By means of the appropriate selection of disks and flexible tubes, an extremely flexible and efficient distributor system is obtained which can establish within a short period of time appropriate connections between, for example, a silo of material and a processing machine.

Other objects, advantages and novel features of the present invention will become apparent from the following detailed description of the invention when considered in conjunction with the accompanying drawings.

BRIEF DESCRIPTION OF THE DRAWINGS

FIG. 4 is a lateral view of the embodiment of FIG. 1;

DETAILED DESCRIPTION OF PREFERRED EMBODIMENTS

Figure 1:
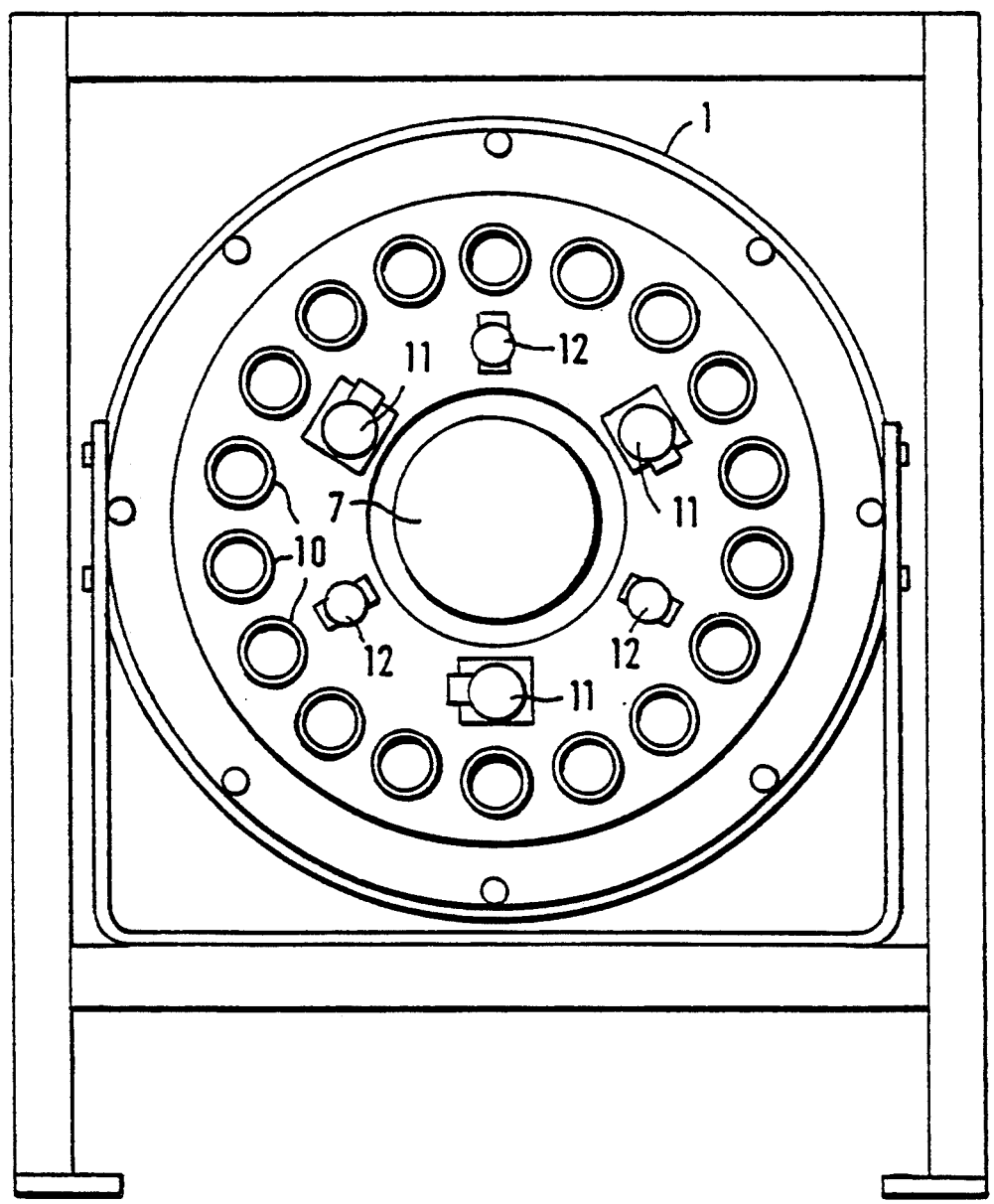
FIG. 1 is a frontal view of a distributor constructed in accordance with an embodiment of the present invention.
Figure 2:
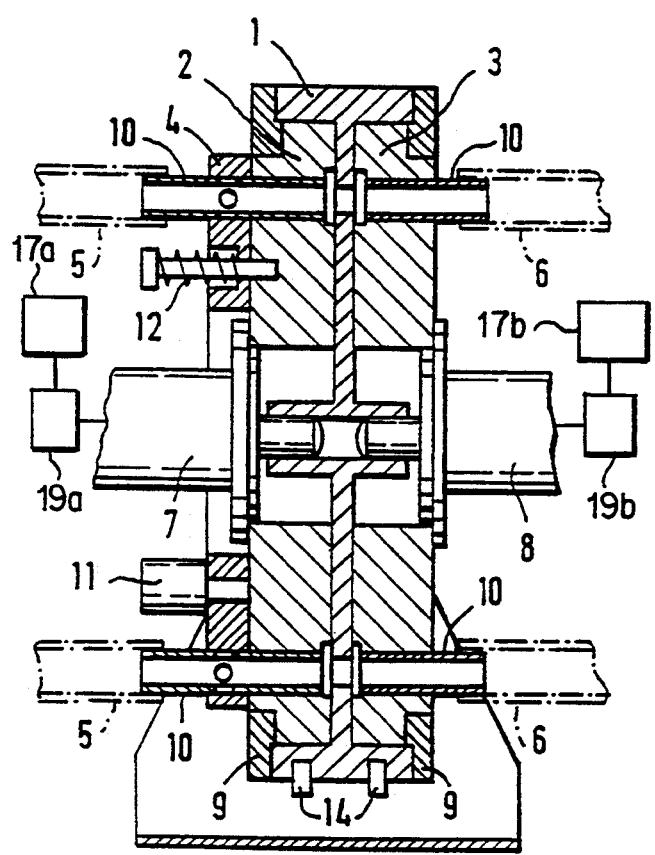
FIG. 2 is a sectional view of the embodiment illustrated in FIG. 1 during a conveyance.
Figure 3:
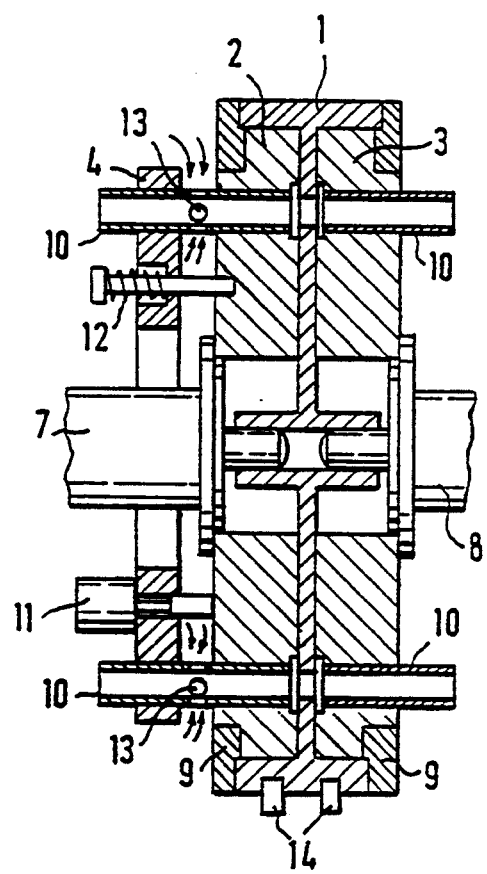
FIG. 3 is a sectional view of the embodiment illustrated in FIG. 1 during the evacuation by suction for the purpose of a change of articles.

FIG. 1 illustrates a multi-way distributor. The illustrated embodiment represents eighteen silo connections and eighteen machine connections, although other numbers of connections can be provided in different embodiments. As seen in FIG. 2, the rotary disks 2 and 3 are disposed in the housing 1 and are axially fixed by the sealing disks 9. The drives 7 and 8 are fastened to the rotary disks 2 and 3 and drive these by way of the housing 1. The motors 17a, 17b coupled to the drives 7 and 8 are illustrated schematically in FIG. 2 only and are constructed to be self-locking. Schematically illustrated planetary gear systems 19a, 19b are coupled between the motors 17a, 17b and the drives 7, 8. An exact rotating position is adjusted electronically or pneumatically in a known manner by approximation initiators 14. The hose couplings 5 and 6 are fastened in the disks 2 and 3 by rotatable connecting pieces 10 in order to counteract torsional forces during the rotating of the disks 2 and 3. The connecting pieces 10 have bores 13. The sealing disk 4 for the evacuation by suction is pressed axially against the rotary disk 2 by lifting cylinders 11 and is held by pressure spring guides 12. The sealing disk 4 for the evacuation by suction can be axially displaced by the lifting cylinders 11.

Figure 5A:
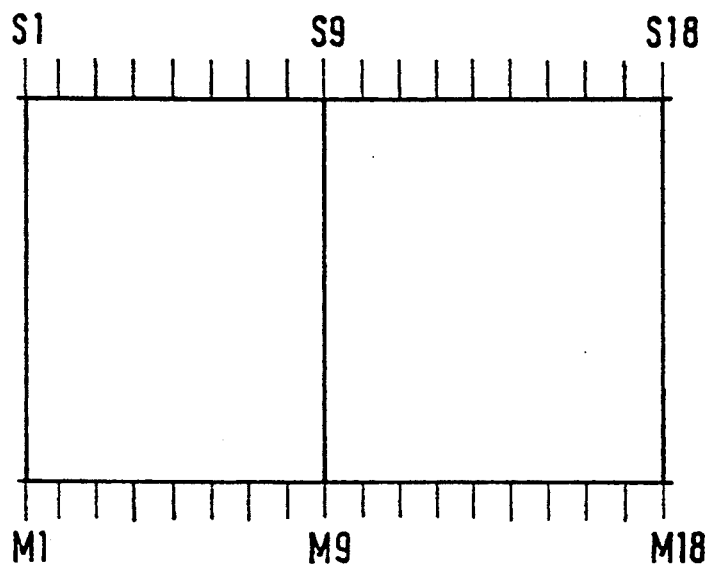
FIGS. 5a and 5b are schematic representations of the connections between machines and silos.
Figure 5B:
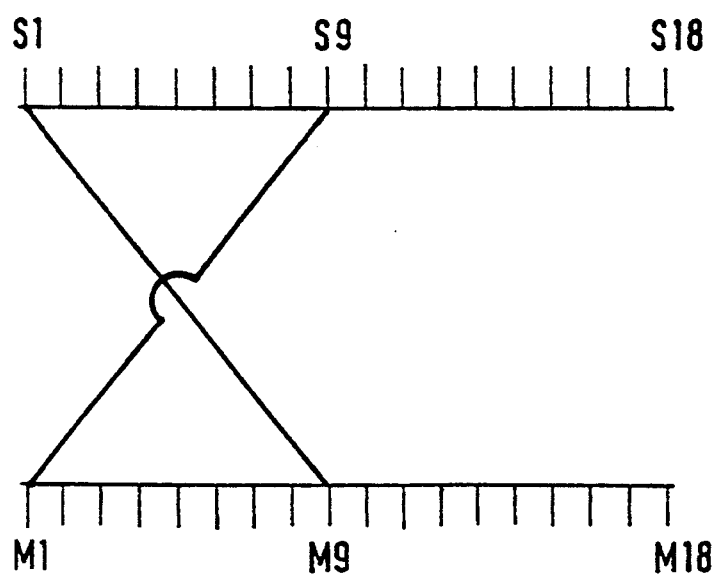

Starting from a zero point, the rotary disks 2 and 3 can be rotated in both directions, for example, by 90°, in order to avoid a complete rotation in this manner and therefore unnecessary torsional stress in the flexible tubes. In the normal position, all hose connections from the silo to the machine are open in a certain combination. In this case, for example, a conveyance by suction may take place from silo S 1 to machine M 1 and from silo S 9 to machine M 9 (FIG. 5A). After the end of a conveyance, for example, from silo S 1 to machine M 1, the lifting cylinders 11 are activated and the sealing disk 4 for the evacuation by suction is axially displaced, whereby the bores 13 for the evacuation by suction are opened up. By means of this operation, the material flow from the silo is interrupted and the line between the suction evacuation bore 13 and the machine is evacuated by suction. If, for example, a material conveyance pairing of silo S 1 to machine M 9 is desired (FIG. 5b), rotary disk 2 is displaced by 90° clockwise and rotary disk 3 is displaced by 90° counterclockwise. Because of the small dead space caused by the housing 1 and the evacuating of residual material carried out by means of bores and the sealing disk 4 for the evacuation by suction, virtually no mixing of materials can occur.

Figure 6:
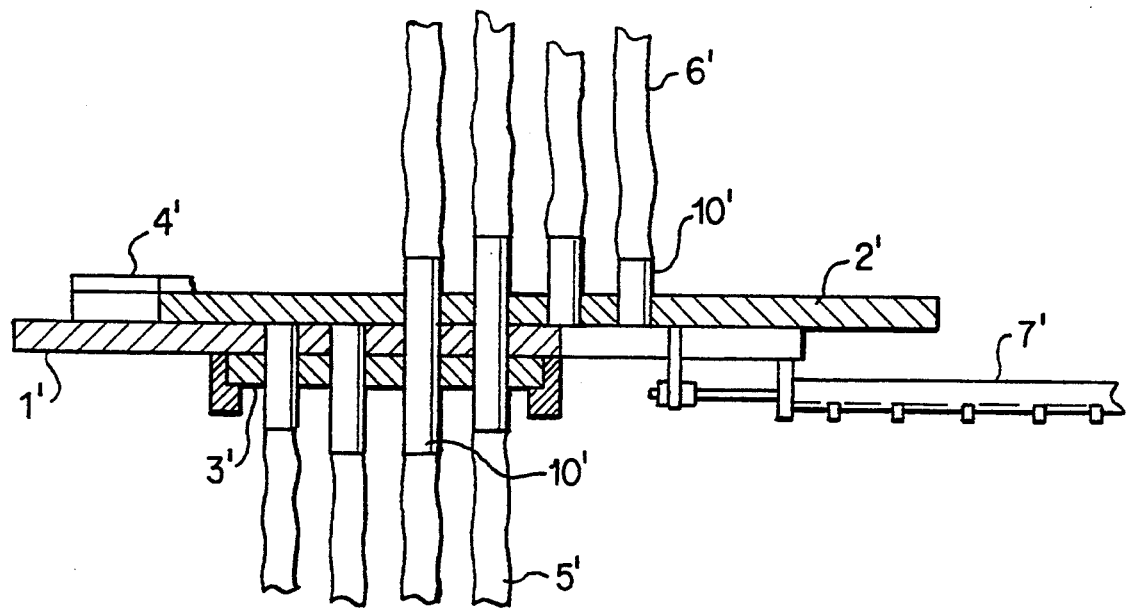
FIG. 6 is a plan sectional view of another embodiment of the present invention.
Figure 7:
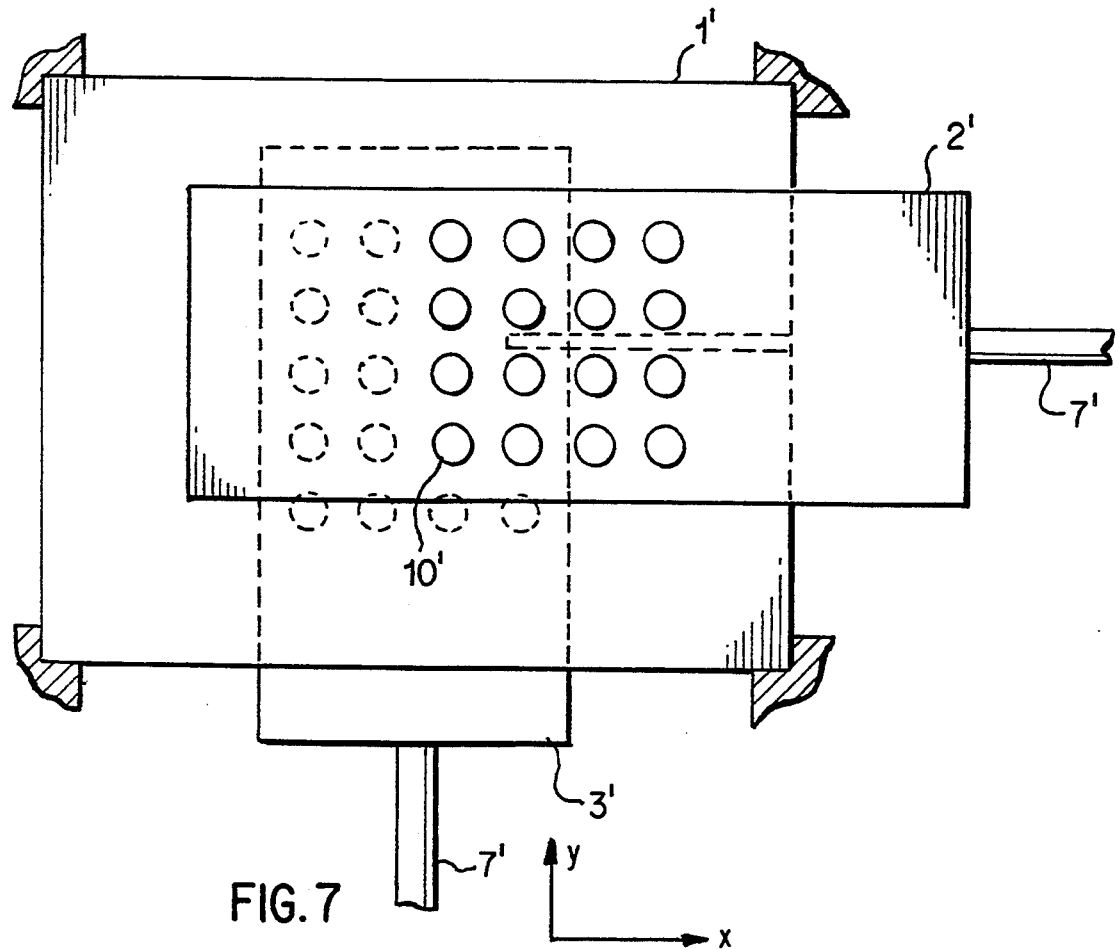
FIG. 7 is an end view of the embodiment of FIG. 6.

FIGS. 1 through 4 show an embodiment of the invention in which the material stream couplings across the movable plates or disks are switched through a change of the relative angular positions of the plates in a polar coordinate system. By contrast, an embodiment illustrated in FIGS. 6 and 7 controls or regulates the distribution of the material streams by guiding the movable plates or disks 2', 3' in two dimensions. Either one or both of the plates 2', 3' can be moved in the x and y direction via the drives 7'.

Figure 8:
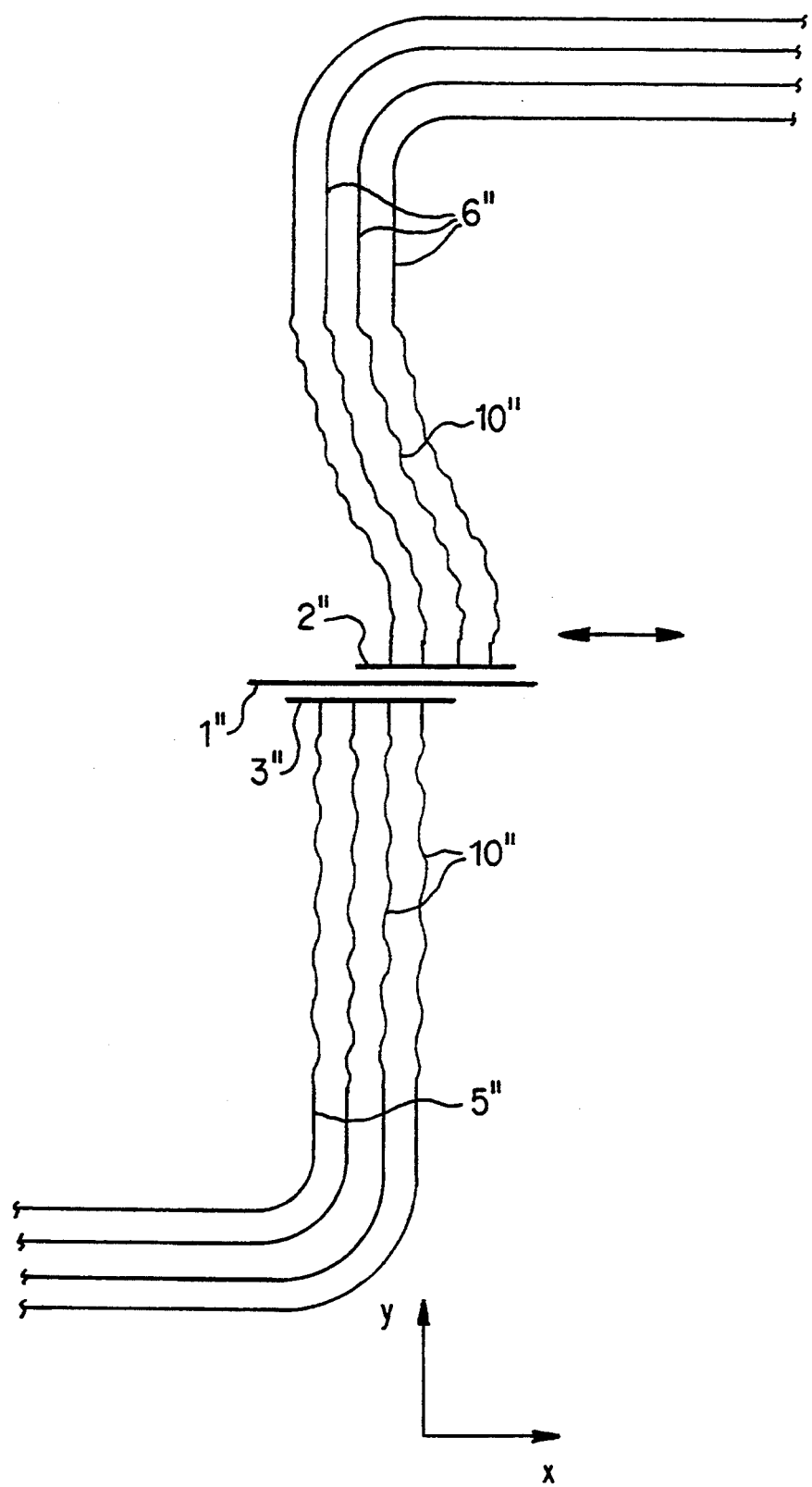
FIG. 8 is a schematic sectional plan view of another embodiment of the present invention.

FIG. 8 schematically illustrates another embodiment in which the plates 2", 3" are moveable relative to one another in one dimension only.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for distribution of material flows in tube systems, comprising:
   at least two mutually parallel and movable disks which have at least two through-holes;
   at least two flexible tubes fastened to at least two of these movable disks;
   wherein, by relative movements of the disks with respect to one another, different connections are achievable by which the material flows are distributed.

2. An arrangement according to claim 1, further comprising adjusting elements coupled to the movable disks, the adjusting elements being at least one of pneumatic and electric.

3. An arrangement according to claim 1, further comprising a driving element coupled to the movable disks, wherein the driving element is a motor operator.

4. An arrangement according to claim 1, further comprising at least one approximation initiator coupled to each movable disk, the approximation initiators controlling coordinates of the movable disks.

5. An arrangement according to claim 1, further comprising connection pieces coupled between the through-holes and the flexible tubes, wherein the connection pieces for the flexible tubes are movably disposed on the movable disks.

6. An arrangement according to claim 5, wherein the connection pieces for the flexible tubes on the movable disks have a perforated area.

7. An arrangement according to claim 6, further comprising a movable sealing disk for the evacuation by suction, the movable sealing disk being mounted during a distributing operation over the perforated area of the connection piece.

8. An arrangement according to claim 7, wherein the sealing disk for the evacuation by suction must be moved away from the perforated area of the connection piece to implement a type change.

9. An arrangement according to claim 1, wherein the movable disks are rotatable about a central axis.

10. An arrangement according to claim 1, wherein the movable disks are guided in one-dimensional curves which are mutually perpendicular.

11. An arrangement according to claim 1, wherein the movable disks are guided in two-dimensional movable curves.

12. An arrangement according to claim 1, further comprising a planetary gear system coupled to the movable disks.

* * * * *